No. 837,891. PATENTED DEC. 4, 1906.
F. W. SHAVER.
REPLANTING ATTACHMENT FOR CULTIVATORS.
APPLICATION FILED MAR. 31, 1906.
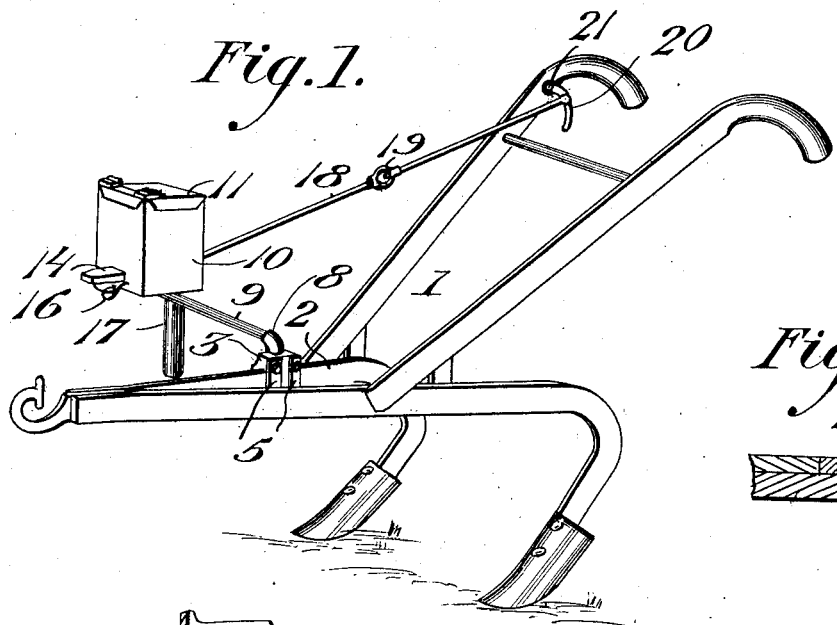
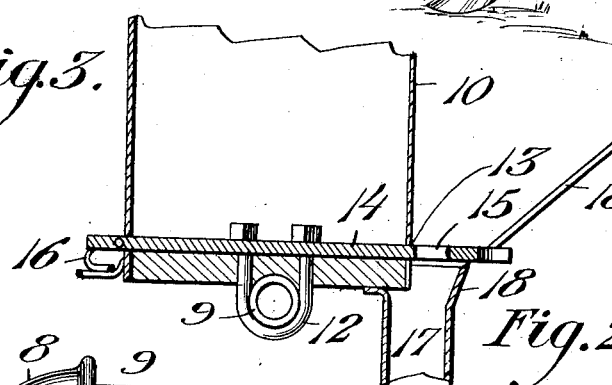
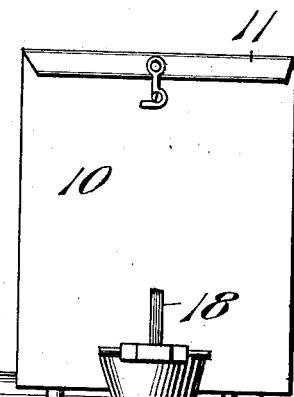
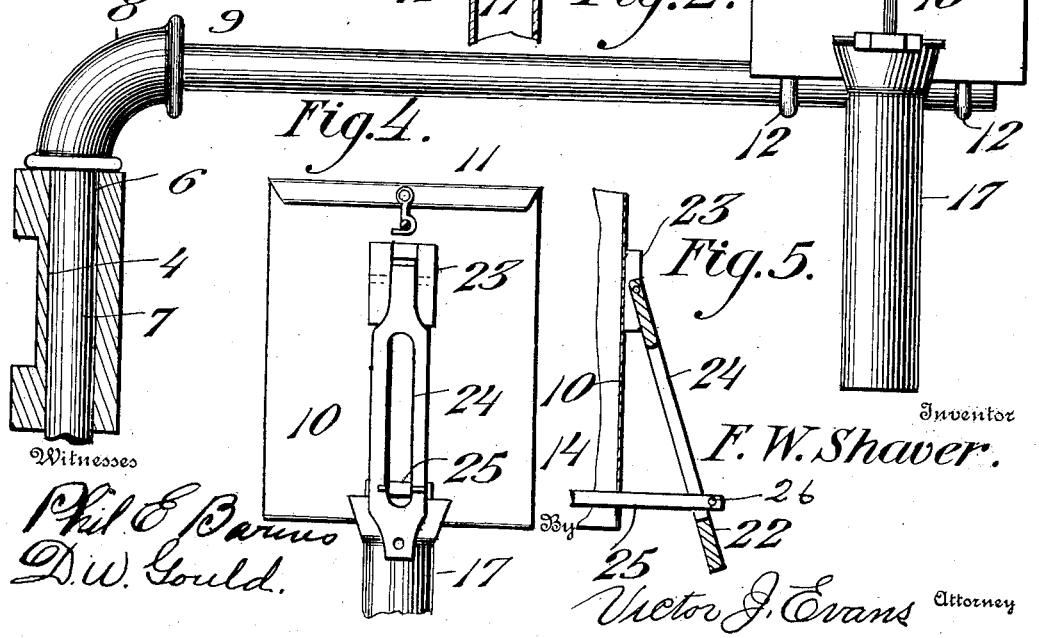
Inventor
F. W. Shaver.
Witnesses
Phil E Barnes
D. W. Gould.
By Victor J. Evans
Attorney

UNITED STATES PATENT OFFICE.

FRED W. SHAVER, OF FAIRVIEW, ILLINOIS.

REPLANTING ATTACHMENT FOR CULTIVATORS.

No. 837,891.  Specification of Letters Patent.  Patented Dec. 4, 1906.

Application filed March 31, 1906. Serial No. 309,184.

*To all whom it may concern:*

Be it known that I, FRED W. SHAVER, a citizen of the United States, residing at Fairview, in the county of Fulton and State of Illinois, have invented new and useful Improvements in Replanting Attachments for Cultivators, of which the following is a specification.

The invention relates to an improvement in replanters designed primarily for attachment to the ordinary cultivator and adapted in use to replant such hills as may be found wanting during the cultivation of the corn.

The main object of the present invention is the production of a device of this character which may be adjustably secured to any ordinary form of cultivator and which in use is arranged for manual manipulation to permit the operator to drop any desired amount of corn in a particular hill during the process of cultivation.

The invention will first be described in the following specification, reference being had particularly to the accompanying drawings, in which—

Figure 1 is a perspective view of a cultivator, showing my improved planter attached thereto. Fig. 2 is an enlarged side elevation of the planter. Fig. 3 is a broken vertical section of the planter. Fig. 4 is a front elevation of a modified form of planter. Fig. 5 is a vertical section through the operating mechanism of said modified form, and Fig. 6 is a broken transverse sectional view illustrating the guideway for the feed-slide.

Referring particularly to the drawings, 1 represents any ordinary form of cultivator, to one of the shovel-beams 2 of which is secured a clamp-block 3, recessed at 4 to receive the beam, clamp-plates 5 overlying the beam and being secured to the block above and below the beam to fix the clamp in position. The block 3 is provided with a vertical opening 6, in which is revolubly mounted a rod 7, which preferably extends below the block and is provided with any suitable means by which it may be secured in adjusted position relative to the block. The upper end of the rod is provided with a coupling 8, forming a connection between said rod and a supporting-rod 9, the coupling being arranged to project the rods 6 and 9 at right angles to each other, as will be seen in the drawings.

The planter proper comprises a box-like casing 10, having a hinged cover 11, the casing being removably secured to the free ends of rods 9 through the medium of U-bolts 12. The front and rear walls of the casing immediately above the bottom thereof are provided with openings 13, arranged to receive a plate 14, hereinafter termed the "feeding-plate." This plate is of greater length than the width of the casing, so that the ends thereof normally project beyond the front and rear walls.

The plate is formed with a feeding-opening 15 of a size to receive one or more grains of corn or other seed, and the forward end of said plate is connected with the forward end of the casing through the medium of a spring 16, so arranged as to normally maintain the feed-plate at its forward limit of movement, in which normal position the opening 15 in said plate is disposed wholly within the plane of the casing—that is, between the front and rear walls thereof.

Secured to the bottom of the casing, at the rear edge thereof, is arranged a feed-spout 17, having a flaring mouth 18, normally disposed in the path of movement of the feed-plate. The spout is so secured to the bottom of the casing as to arrange the greater portion of the mouth thereof rearwardly beyond the edge of said bottom, so that said mouth is practically free of obstruction and arranged immediately beneath the feed-plate. An operating-rod 18, preferably in the form of two sections adjustably connected by a turnbuckle 19, is secured at its forward end to the rear end of the feed-plate 14 and at its rear end to a hand-lever 20, pivotally secured at 21 to one of the handle-bars of the cultivator immediately adjacent the gripping portion of said bar.

In use with the parts constructed and arranged as described the rod 7 is adjusted in the block 3 so as to dispose the discharge end of the feed-spout with particular relation to the row of plants being cultivated, after which said rod is fixed relative to the clamp-block to maintain a fixed line of discharge from the planter. The operator during the course of cultivation may through the obvious operation of the lever 20 draw the feed-plate in a rearward direction to dispose its opening 15 through the mouth of the feed-spout, so that the corn or other seed withdrawn by the walls of the opening of the plate from the casing will gravitate through the spout in position to be covered by the earth thrown up by the shovels of the cultivator. It is of course understood that the casing being filled or partially filled with seed will recharge the opening 15 in the feed-plate upon each return of said feed-plate to normal position, so that the apparatus as a whole is automatic in operation other than the manipulation necessary to move the feed-plate to operative position relative to the mouth of the spout.

In the use of the planter with the riding-cultivators, in which the operator is on a plane above the planter, it is desirable that means be provided for preventing a binding between the feed-plate and the casing-walls during movement of said plate, and to this end the operating-rod 18 when the device is used with riding-cultivators is secured to the lower end of the lever 22, which is hinged at 23 to the rear wall of the casing. The lever is centrally provided with an elongated aperture 24 to receive the reduced end 25 of the feed-plate 14, a pin 26 being passed transversely through the extreme rearward end of the feed-plate, so as to overlie the edges of the opening 24. The opening 24 is of course of such length as to extend below the plane of the feed-plate when the latter is in normal position, thereby permitting the necessary rearward movement of the lever 22 under the influence of the rod 18 without causing a relatively upward movement of the rear end of the plate.

From the construction described it is obvious that the clamp-block 3 may be adjusted longitudinally of the shovel-beam and that the rod 7 may be revolubly adjusted in said block, whereby provision is made for disposing the planter proper in any desired relation to the shovels or cultivator.

The device as a whole is readily applicable to any of the usual forms of cultivator and may quickly be removed therefrom without in any way detracting from the effectiveness or ordinary uses of the cultivator proper.

Having thus described the invention, what is claimed as new is—

The combination with a farm implement, of a clamp-block adjustably secured thereto, a supporting-rod connected to the clamp-block, and a replanter movably secured to the rod, said replanter comprising a closed casing, a feed-plate longitudinally movable within the casing and projecting in both directions beyond opposing walls thereof, said plate being mounted in a channel formed in the casing-bottom and being formed with a feed-opening, a spring connected with the casing and with one of the projecting ends of the plate, a rod connected at one end to the opposite end of the plate, a lever pivotally connected to the handle of the farm implement, a connection between said rod and lever, a feed-spout secured to the bottom of the casing, a portion of the upper open end of said spout being arranged beyond the proximate wall of the casing and below the operative plane of the feed-plate and a feed-opening in said plate registering with the exposed mouth of the spout in operation.

In testimony whereof I affix my signature in presence of two witnesses.

FRED W. SHAVER.

Witnesses:
  H. D. YOUNG,
  CHAS. TRAVERS.